July 6, 1954 J. J. HYLAND Re. 23,847
WIRE TYPE PRINTING MACHINE
Original Filed April 20, 1949 4 Sheets-Sheet 1
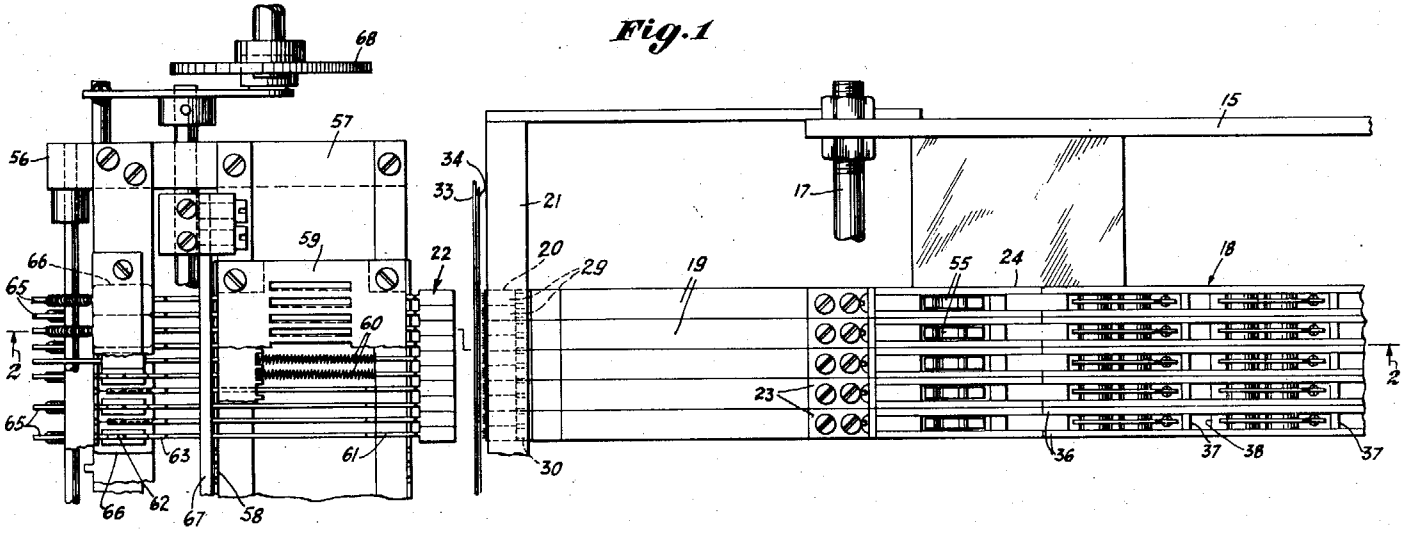
Fig. 1
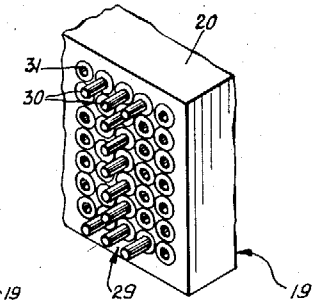
Fig. 5
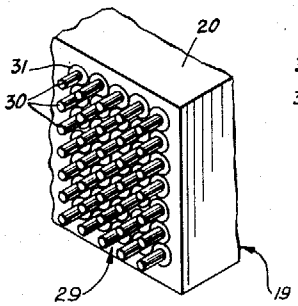
Fig. 4
Fig. 3
| | | | | |
|---|---|---|---|---|
| 1 | 2 | 3 | 4 | 5 |
| 6 | 7 | 8 | 9 | 10 |
| 11 | 12 | 13 | 14 | 15 |
| 16 | 17 | 18 | 19 | 20 |
| 21 | 22 | 23 | 24 | 25 |
| 26 | 27 | 28 | 29 | 30 |
| 31 | 32 | 33 | 34 | 35 |
INVENTOR.
John J. Hyland,
BY Charles P. Boberg
ATTORNEY.

July 6, 1954 J. J. HYLAND Re. 23,847

WIRE TYPE PRINTING MACHINE

Original Filed April 20, 1949 4 Sheets-Sheet 2

INVENTOR.
John J. Hyland,
BY Charles P. Boberg
ATTORNEY.

WIRE TYPE PRINTING MACHINE

Original Filed April 20, 1949 4 Sheets-Sheet 3

INVENTOR.
JOHN J. HYLAND
BY Charles P. Boberg
ATTORNEY

WIRE TYPE PRINTING MACHINE

Original Filed April 20, 1949 4 Sheets-Sheet 4

INVENTOR.
JOHN J. HYLAND
BY Charles P. Boberg
ATTORNEY

Reissued July 6, 1954

Re. 23,847

UNITED STATES PATENT OFFICE 23,847

WIRE TYPE PRINTING MACHINE

John J. Hyland, New York, N. Y., assignor to Burroughs Corporation, a corporation of Michigan Original No. 2,632,386, dated March 24, 1953, Serial No. 88,527, April 20, 1949. Application for reissue April 15, 1954, Serial No. 423,551

8 Claims. (Cl. 101—93)

Matter enclosed in heavy brackets [ ] appears in the original patent but forms no part of this reissue specification; matter printed in italics indicates the additions made by reissue.

This invention relates to improvements in printing machines and has particular reference to a machine where one or more print heads, each comprising a plurality of printing elements capable of selection in various combinations to form different characters, are employed to print characters identified by the selected combinations.

In the co-pending application of W. Wockenfuss and H. A. Speh, filed March 8, 1949, Serial No. 80, 136, there is disclosed a machine wherein the printing elements of a print head are selectively controlled in various combinations to form different characters and in which the printing of any character by a selected combination of said elements results from the advancement thereof from a non-print to a print position.

In accordance with the present invention, it is proposed to accomplish the printing of a character by the selection and subsequent withdrawal of a combination of printing elements from print to non-print position while permitting the remaining elements to stay in print position to form the character to be printed.

The inventive idea involved is capable of receiving a variety of expressions one of which, for purposes of illustration, is shown in the accompanying drawings; but it is to be expressly understood that said drawings are employed merely to facilitate the description of the invention as a whole and not to define the limits thereof, reference being had to the appended claims for this purpose.

In the drawings:

Fig. 1 is a fragmentary plan view, partly broken away, of a printing machine constructed in accordance with the invention;

Fig. 3 is a diagrammatic view of one of the print heads with the various printing elements thereof indicated by numerals;

Fig. 4 is an enlarged fragmentary perspective view of a print head illustrating all of the printing elements in a projected or printing position which they assume prior to the selection and withdrawal of certain of them to non-print position to form a character by means of those that remain in print position;

Fig. 5 is a view similar to Fig. 4 showing certain of the printing elements withdrawn to form the letter I.

Figure 2:
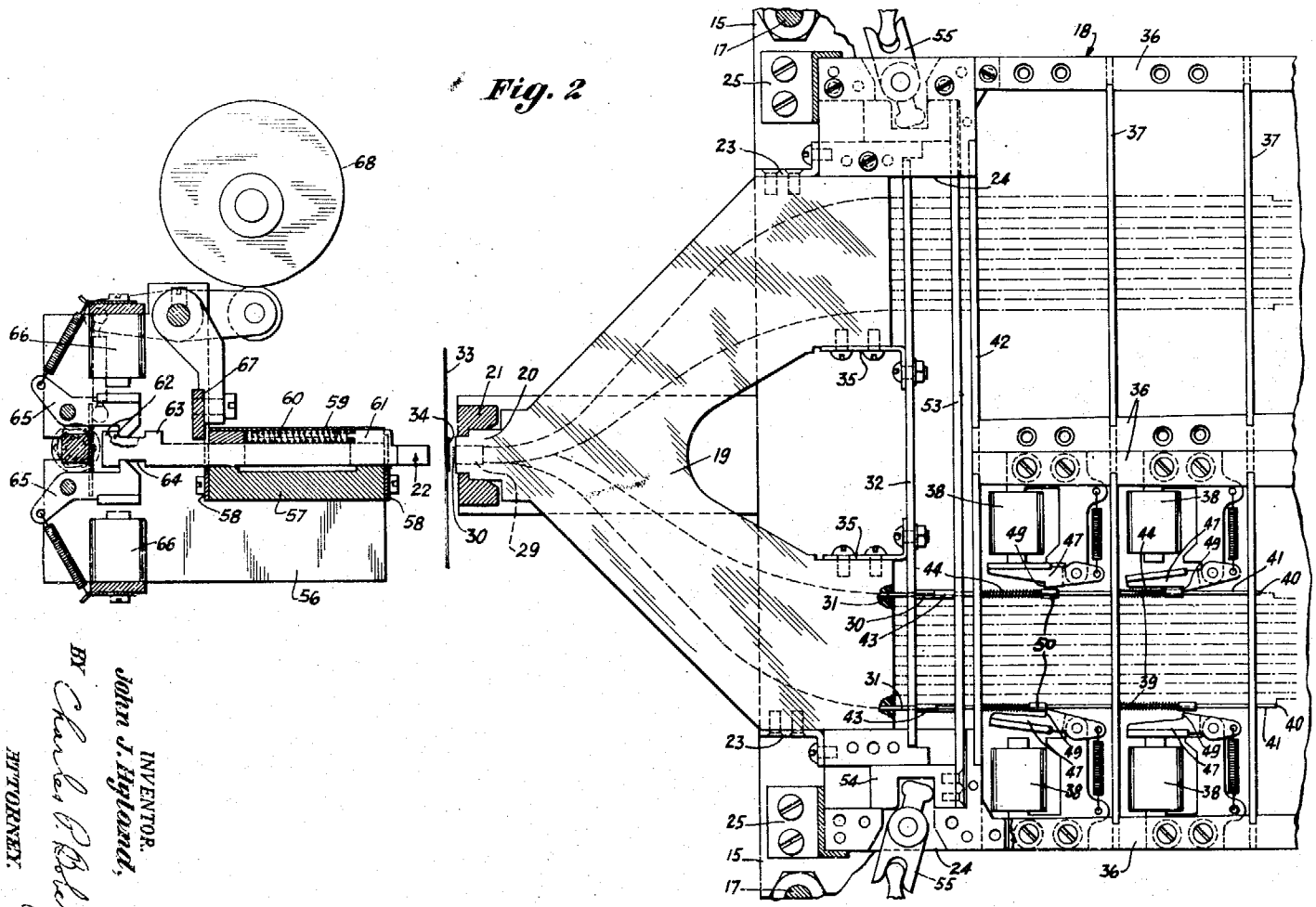
Fig. 2 is a fragmentary longitudinal section taken substantially on the line 2—2 of Fig. 1, partially illustrating one of the print sections which includes two print heads arranged alongside one another and that combine with the print heads of the other sections to form a single row of heads.

Structurally, the machine of the present invention is shown in Figs. 1 to 5 as comprising a plurality of individual print sections, generally indicated at 18, in the form of substantially rectangular and narrow panels which are vertically arranged in abutting relation and supported between suitable side frame plates 15 secured together on opposite sides of the machine by the tie rods 17. The front of each panel is constituted by a block 19 of any suitable synthetic resin capable of being molded and having its top and bottom edges converging forwardly so as to impart a generally tapered formation to said block with its forward extremity terminating in a rectangular end portion 20 which, along with similar portions of the other blocks of the various panels, is freely mounted in a support 21 extending across the front of the machine and attached to the frame plate 15 thereof in any suitable manner. Brackets 23 secure the rear portion of each block 19 to the recessed heads 24 at the upper and lower front corners of the main section of each panel 18, and upper and lower angle straps 25 secured to the plates 15 and extending across the front of the machine are engaged by the heads 24 of all the panels to thereby assist in retaining the latter in operative position.

As shown in Fig. 1, the end portion 20 of each block 19 contains two print heads 29 arranged alongside each other so that the heads of the various blocks 19 combine to provide for one line of printing. Each head *29* consists of a group of thirty-five printing elements 30, as shown in Figs. *4 and 5*. [3 to 5, and each group is indicated in the block 19 (Fig. 2) by two dotted lines.] Each element 30 is in the form of a wire of very small cross sectional area and extends through a guide tube 31 molded in the block 19 so that the wire will have slight reciprocating movement therein, and said tube has its rear projecting end fixed in a mounting plate 32 extending between the upper and lower heads 24 and to which plate the block 19 is also secured by brackets 35. Said tubes, and consequently the wires 30, converge forwardly into the end portion 20 of the block 19 where the wires of each group combine to form one of the print heads 29. At the start of a print cycle, all thirty-five wires of a head are projected therefrom to print position, as clearly shown in Figs. 1 and 4, and said wires are selectively controlled in accordance with the analysis of a record, such as a tabulating card, to form any particular character by retracting certain of said wires to non-print position (Fig. 5) and leaving those wires which are to identify and form said character in print position. As the selected wires are being withdrawn, a print hammer, generally indicated at 22, and individual to each head is released, in a manner to later appear, to advance in a rearward direction to operative position where it will strike a sheet 33 between which and the wires in print position is interposed a carbon strip 34 which then causes said wires to impress the desired character upon said sheet which is fed past the print heads by any well known means. Fig. 5 illustrates the letter I as being formed and, by reference to Fig. 3, it will be seen that in order to form said letter all wires 30 are withdrawn except those numbered 2, 3, 4, 8, 13, 18, 23, 28, 32, 33 and 34.

In the main portion of each panel 18, as shown in Fig. 2, each of the two groups of wires 30 has a supporting unit forming a part of said panel and consisting of upper and lower pairs of spaced supporting bars 36, the inner opposed edges of which converge rearwardly so as to present inclined surfaces for a purpose to presently appear. Joining said bars 36 of each supporting unit are equi-distantly spaced guide plates 37 through which extend the rear portions of the printing elements, which portions are in the form of rods 41. The forward ends of said rods 41 are slidable in the guide plates 42 and are affixed to the rear ends of the wires 30 that project from the guides 31 where the latter are secured in the plate 32, and thus said rods 41 become part of the printing elements. At the junction of the rods 41 with their wires 30, they are provided with enlargements 43 the purpose of which will later appear. Rearwardly of the plate 42, each rod 41 is further provided with a stop collar 50 between which and said plate is interposed a spring 44 which forms part of a mechanism for cyclically controlling the reciprocating movement of the printing element between print and non-print positions, and which acts to constantly urge said element toward its non-print position when the spring is under compression.

As in the aforementioned co-pending application, the rear portions 41 of the printing elements are of different lengths as indicated by the stepped formation of the upper and lower dot and dash lines in each group. Also, the elements in each group are arranged in three vertical rows, the two outer ones containing twelve elements each and the third or intermediate row containing eleven elements, thus making thirty-five elements in all with the center one in the intermediate row being of greatest length and positioned coincidentally with the center line of the supporting unit, as described in said application. The four elements shown in full lines in Fig. 2 are the uppermost in the two outer columns referred to, the two shortest elements having their rear ends terminating at 39 just rearwardly of the front guide plate 37 and the other two elements directly in back of the first two having their rear ends terminating at 40 just to the rear of the second guide plate 37.

The reciprocatory movement of each of the printing elements is controlled by an electromagnetic device 38 mounted upon the inclined surface of one of the two pairs of bars 36 and between two adjacent guide plates 37 as shown in the lower portion of Fig. 2, those devices 38 in the upper portion being omitted to avoid duplication of illustration. By having the surfaces of the bars 36 inclined it will be apparent that as the printing elements progressively increase in length to the right and approach the center line of the supporting unit, the devices 38 will also be positioned so as to progressively approach said center line and thus be brought into cooperative relation with their respective rods 41. As shown in Fig. 2, the two upper and lower devices 38 to the left are associated respectively with the rods 41 forming a part of the upper and lowermost printing elements in one of the outer vertical columns, while the two devices 38 to the right are likewise assocciated with the rods 41 of the upper and lowermost printing elements in the other outer vertical column of printing elements which are directly behind the first named elements. Also, the upper left hand and lower right hand devices 38 are shown in their energized condition which will permit their respective printing elements to be retracted to non-print position under the control of the springs 44, while the other two devices 38 are shown de-energized so as to prevent rearward movement of their respective printing elements and therefore retain them in print position. To thus control the printing elements, each device 38 has a spring controlled armature 47 which constitutes a latch for its associated printing element. When a device 38 is de-energized a shoulder 49 formed on the armature latch 47 engages behind the stop collar 50 on its associated rod 41 so as to retain the printing element in print position, and when said device is energized said shoulder is disengaged from its collar to permit the spring 44 to urge the printing element rearwardly to non-print position, this latter movement being limited by engagement of the enlargement 43 with the restoring bail 53 shown in Fig. 2 in its rear or dwell position. Said bail assumes this dwell position at the beginning of a print cycle when all of the devices 38 in the various panels are de-energized to maintain the printing elements of the various heads in their print position. After selective and simultaneous energization of devices 38 in all of the print sections, which permits their respective printing elements to be retracted from print position, and the concomitant operation of the print hammers 22 to effect printing, the bail 53 in each print section is advanced so as to restore to print position those printing elements which have been retracted, this restoration being accomplished by engagement of the bail with the enlargements 43 of the various retracted printing elements. Immediately thereafter, the bail 53 is restored to its dwell position. In this manner the bail 53 cooperates with the springs 44 to provide the means for controlling the cyclic operation of the printing elements. Each bail 53 extends between the heads 24 of its associated panel and is substantially the width thereof and the slight reciprocating movement to be imparted to the bail between the plates 32 and 42 is accomplished by providing the upper and lower ends of said bail with recessed blocks 54 slidable in the heads 24. Each block 54 receives in its recess one end of a bell crank 55 rockingly supported in the head 24, and these bell cranks for the bails 53 of the various print sections of the machine are simultaneously operated to reciprocate said bails by means of any desired mechanism common to the bell cranks, such as the cam operated mechanism disclosed in the aforesaid co-pending application.

The mechanism by which the print hammers 22 are controlled so as to operate in time relation to the formation of characters by the withdrawal of selected elements to non-print position, is mounted in front of the row of print heads 29 and comprises a supporting frame 56 carrying a guide casing 57 in which the hammers 22, one for each print head, are slidably disposed and held in alignment with their respective heads by the combs 58 arranged along the front and rear edges of said casing. A removable top plate 59 encloses the coil springs 60 which engage abutments 61 on the hammers 22 so as to project them rearwardly to print position when selected printing elements start their movements toward non-print position. At the end of each print hammer remote from the abutment 61, the same is provided on its upper edge with two spaced abutments 62 and 63 and in its lower edge with a recess 64. The hammers 22 are alternately controlled from above and below by the armature latches 65 of the magnets 66 supported in the frame 56. Thus, the hammer shown in Fig. 2, and partly broken away to show the next adjacent hammer, is controlled by the latch 65 of the lower magnet in cooperation with the recess 64 in the lower edge of the hammer, while said next adjacent hammer is similarly controlled by the latch 65 of the upper magnet in cooperation with the abutment 62 of the latter hammer. When the magnets 66 are deenergized, their latches assume the position shown, but if and when said magnets are energized their armature latches will be disengaged from the hammers which will then be impelled reawardly to print position by the springs 60. Immediately upon completing the printing operation by the engagement of the hammers with the sheet 33, said hammers are returned to their latched positions by a common restoring bail 67 pivotally mounted in the frame 56 so that when actuated it will engage the abutments 63 of all the operated hammers and restore them to the position shown. Any suitable means such as a rotating cam 68 may be utilized to control the bail 67 and said cam may be operated by the same drive, shown in said co-pending application, which simultaneously actuates the bails 53 of the various print sections.

Figure 6:
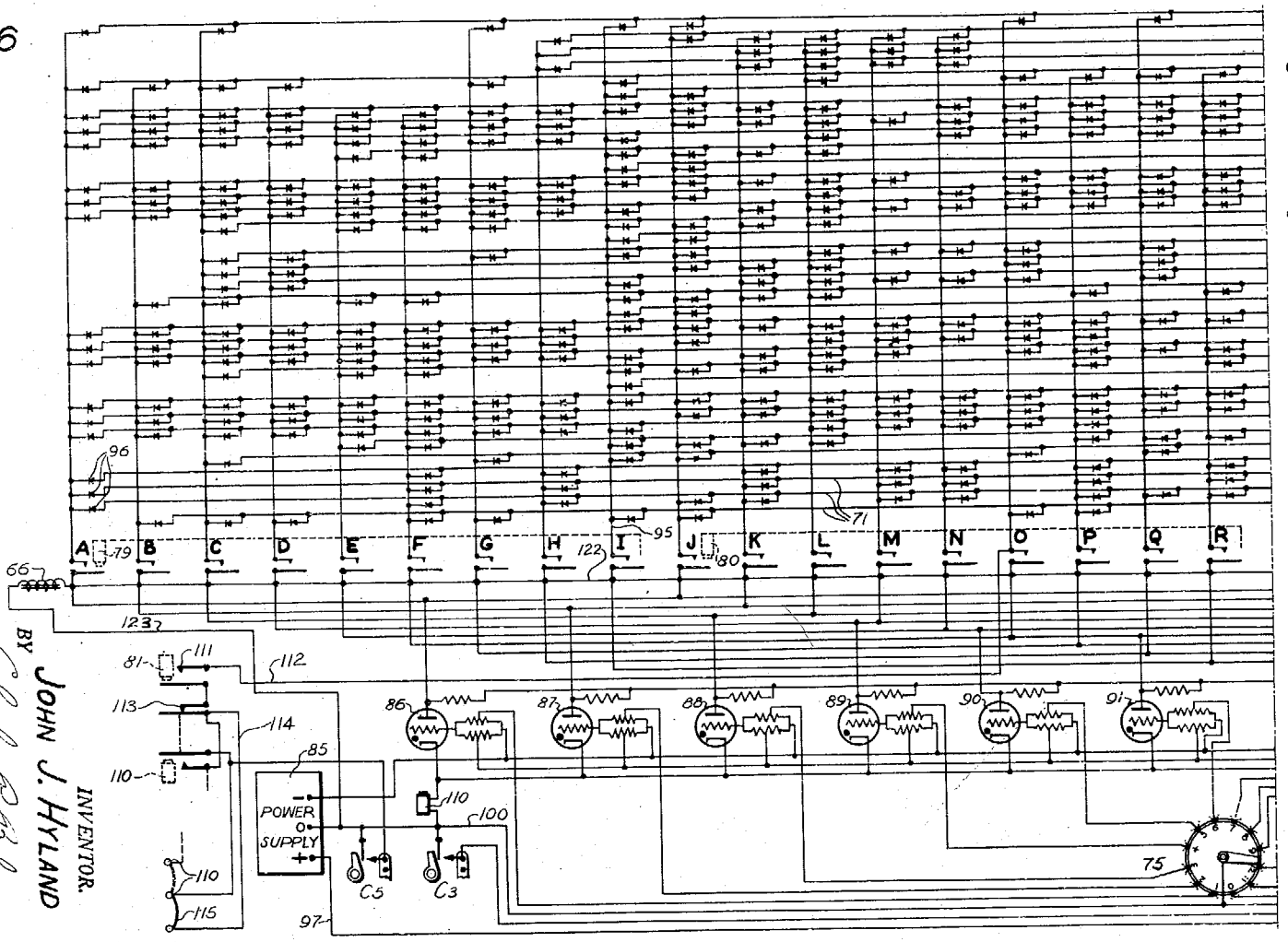
Figs. 6 and 7, when combined, illustrate diagrammatically the control circuits for one of the print heads by which selection of the printing elements thereof to form any particular character is accomplished in accordance with the analysis of a punched card or similar statistical record.
Figure 7:
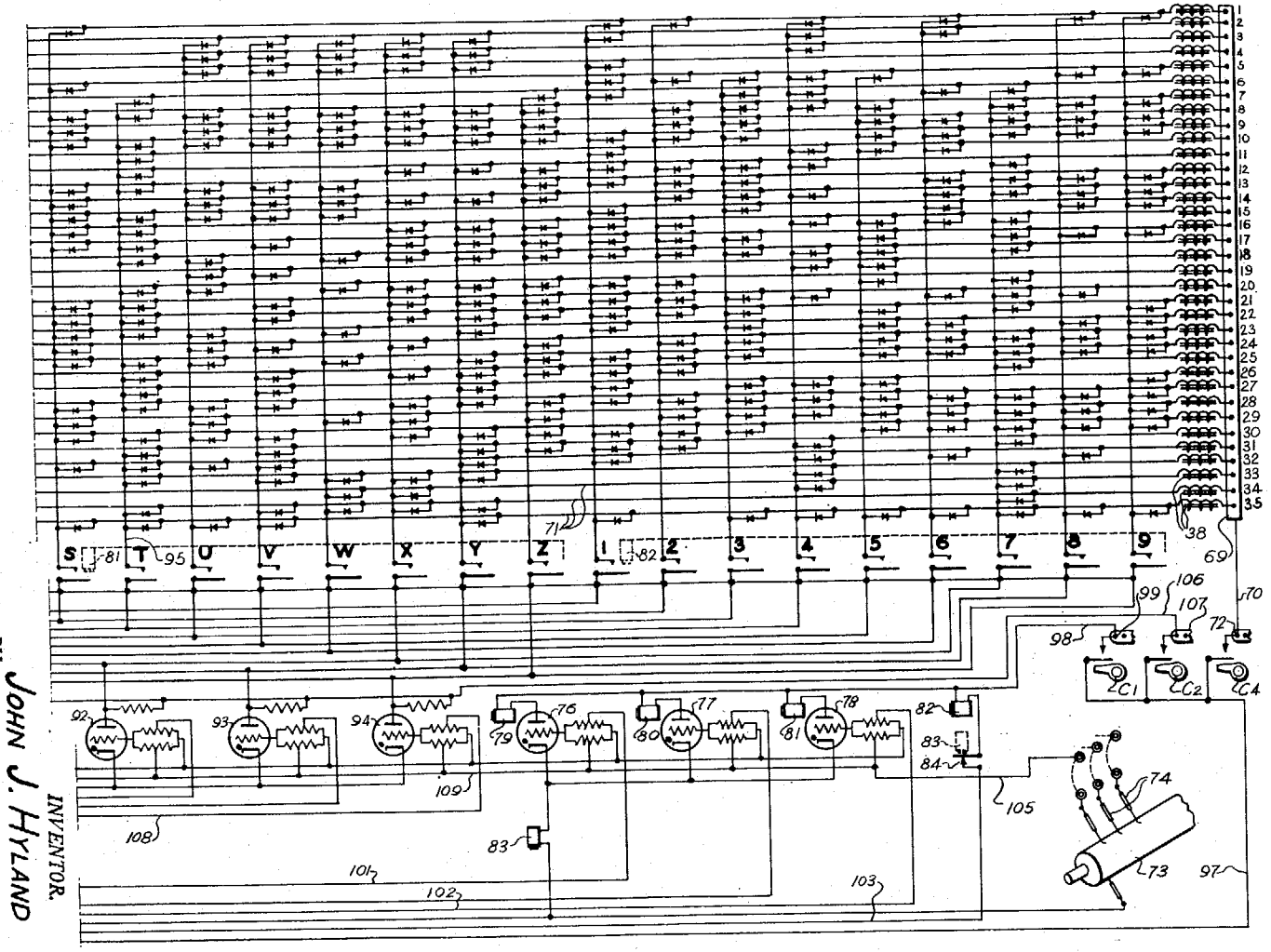

Reference is now had to Figs. 6 and 7 which illustrate the circuits that selectively control the thirty-five electromagnetic devices 38 allotted to the printing elements of one print head, the circuits for the remaining print heads being duplicates of those shown. The withdrawal from print position of selected groups of printing elements so as to form various characters by those elements remaining in print position, is effected by the selective energization of devices 38 in various combinations and in accordance with any desired code such as a well known two-hole combinational code wherein twelve index point positions are provided in each column of a card. The first three of said positions to be sensed in a column for an alphabetical character are usually designated at #12, #11 and #10 and are the zoning points assigned, respectively, to the letters A–I, J–R and S–Z, each of said letters having further assigned thereto in its column one of the other numerical index points 1 to 9.

In this code and in the system herein shown, the character 0, where it is is employed to designate the letter or a zero, is formed by the energization of the same group of devices 38 but, as will be seen in the course of description, the selection of said group for the printing of a zero is accomplished differently for the latter. The coils of said devices each have one terminal thereof joined to a common bus bar 69 connected to a conductor 70, and the other terminal thereof to an individual conductor 71, and said conductor 70 is connected to a bus 72 to which all similar conductors of the various print heads are joined.

A record card feed mechanism (not shown) of any desired construction successively feeds cards to a sensing device comprising a contact roll 73 and a series of brushes 74, one for each card column, which progressively sense punched index points in the card columns as the card is fed between the roll and brushes, and a distributor 75 operates in synchronism with the feed of the cards so that the wiper thereof will successively engage its twelve contacts simultaneously with the sensing of the corresponding index points in the card columns, all the contacts of said distributor being multiplied to the other print heads.

Assigned to the index point positions #12, #11 and #0 in each column of a record card are the three zoning Thyratrons 76, 77 and 78 of standard construction which have the characteristics of remaining conductive, once they are fired, until the voltage is removed from the plate elements thereof. The plate elements of said tubes are connected to associated zoning relays 79, 80 and 81, and the firing of any one of said tubes by the sensing of a hole at a zoning index point position in the card simultaneosuly with the engagement of the wiper of the distributor 75 with a contact corresponding to said point, determines the zone of the alphabetical character to be printed. Thus, when the tube 76 is made conductive through the brush 74 and the distributor 75, its relay 79 will be energized and remain so as long as the tube is conductive. In energizing, the relay 79 closes its nine contacts designated A to I (Fig. 6) thereby determining that the character to be printed is contained within this group. In the same manner, energization of relays 80 or 81 establishes that the character to be printed is in the J to R or the S to Z groups. The contacts A to Z of the various zones are connected to different groups of the conductors 71 leading to the electromagnetic devices 38 so that when final selection of any contact in any one of said zones is made by the sensing of the second hole in a card column, as will later appear, the devices 38 assigned to said contact will be energized and their respective printing elements will be retracted to non-print position, leaving those elements in print position which are to form the desired character. The fourth zoning relay 82 is assigned to the printing of the numerals 1 to 9, but if either one of the tubes 76, 77 or 78 is fired, a relay 83 multipled to the cathode elements of said tubes is energized and, by opening its back contact 84, will disconnect relay 82 from the power supply 85 (Fig. 6). On the other hand, if no zoning tube is fired to effect the printing of an alphabetical character due to the failure of the sensing brush 74 to sense a hole at any one of the zoning index points, relay 82 will be energized to close its group of contacts 1 to 9 shown at the right of Fig. 7 to await the sensing of a hole in a card column designating the particular numeral to be printed.

With any one of the tubes 76 to 78 rendered conductive and its corresponding set of alphabetical contacts closed, the second hole of the two-hole combination in a card column is then sensed by its brush 74 and, through the distributor 75, this results in the firing of one of the nine Thyratrons 86 to 94 identified by the sensed hole, and the establishment of circuits through one of said sets of alphabetical contacts in the selected zone to the group of devices 38 which are to control the withdrawal from print position of those printing elements not to be utilized in the printing of the desired alphabetical character.

As one specific example, it will be assumed that the letter I is to be printed. The corresponding contact for this letter is in the first zone controlled by the zoning Thyratron 76 and relay 79, and the conductors 95 leading from the contact I are connected, through a group of conductors 71, to twenty-four devices 38 indicated in Figs. 3 and 7 by the numerals 1, 5, 6, 7, 9, 10, 11, 12, 14, 15, 16, 17, 19, 20, 21, 22, 24, 25, 26, 27, 29, 30, 31 and 35 so that said devices will be energized to effect withdrawal of their respective printing elements and leave in print position the eleven remaining elements which will form the letter I. Rectifiers 96 are interjected in all the circuit groups leading from the various alphabetical and numerical contacts controlled by the relays 79, 80 and 81 so as to prevent any possible shunting effect of unrelated circuit groups which may have multiple connections to various conductors 71. In a similar manner, the conductors leading from the *thirty-five* [thirty-four other] alphabetical and numerical contacts are variously connected through groups of conductors 71 to the devices 38 which will control the withdrawal of all the necessary printing elements to form the characters individual to said contacts.

The cycle of operation for printing various characters will now be described specifically in connection with the printing of the letter I which involves the successive sensing, by the brush 74, of the punched index points #12 and #9 in the card column assigned to said brush, which sensing results in the firing of the Thyratrons 76 and 94. Immediately upon entry of the leading edge of the card between the roll 73 and brush 74, the code holding cam c1 (Fig. 7) closes its contact and remains in this condition throughout the entire operating cycle including the printing of the selected character. At the beginning of the cycle, the three zoning Thyratrons 76 to 78 and the nine numeric Thyratrons 86 to 94 are not conductive due to the application of a negative bias from the power source 85 through the bridge network of each tube to the grid thereof and, upon closure of the contact of holding cam c1, positive voltage is applied to the plate elements of the tubes 76 to 78 from the source 85 and over the conductor 97, through the contact of said cam, and the conductor 98 connected to the bus 99 common to all the print heads. The brush 74 now starts to successively sense the index point positions #12, #11 and #0 and, simultaneously therewith, the wiper of the distributor 75 successively engages contacts corresponding to said points. Since the index point #12 is punched for the letter I, contact by brush 74 will be made with the roll 73 as the hole is sensed and, with the distributor of wiper simultaneously engaging its contact #12, zero potential from the intermediate terminal of the source 85 will be applied through the conductor 100, the #12 contact of said distributor, and the conductor 101 to one midpoint of the bridge network connected to the grid element of the zoning tube 76 and, at the same time, said potential is connected by the conductor 100 to the other midpoint of said network to roll 73, brush 74, and conductor 105. The grid voltage of the tube 76 is thereby raised to zero, causing said tube to fire, whereupon current will flow from the positive terminal of the source 85 over the conductor 97, through the cam c1, the conductor 98, the windings of relays 79 and 83 connected, respectively, to the plate and cathode elements of tube 76, and then over the conductor 100 to the intermediate terminal of the source 85. Said relays 79 and 83 will be energized in this circuit and held so by the cam c1. Energization of relay 83 opens its back contact 84 to thereby disconnect the positive terminal of the source 85 from the winding of the numerical zoning relay 82 and thus prevents the latter from closing its contacts 1 to 9. Energization of relay 79 closes its group of contacts A–I and the zone in which appears the character to be printed is now selected.

The card being analyzed now passes to #11 and #0 index points under the brush 74 but, since no hole is punched at either of said points, the tubes 77 and 78 are not fired and, consequently, the other two sets of alphabetical zone contacts of relays 80 and 81 remain open. Immediately upon completion of the sensing of the three zoning points on the card, the numeric holding cam c2 is operated to close its contact to thereby prepare a holding circuit for any one of the subsequently fired numerical tubes 86 to 94, said circuit extending from the positive terminal of source 85 over the conductor 97, through the contact of cam c2, and the conductor 106 connected to the bus 107 to which all similar conductors of the circuits for the remaining print heads are joined, said conductor 106 being connected through a resistance to the plate element of each of said numeric tubes. Said cam c2 maintains its contact closed throughout the sensing of all nine numerical index points, and opens said contact directly after the restoring bail 53 advances those printing elements which have been retracted by the energization of their respective devices 38.

Immediately upon conclusion of the sensing of the zoning index points and before the brush 74 starts to sense the numerical index points, the numeric zone holding cam c3 (Fig. 6) closes its contact and holds it closed, for a purpose which will later appear, until the printing operation is completed. The brush 74 now senses the hole punched in the #9 index point which completes the combinational code for the letter I. When hole #9 is sensed in the card, the wiper of the distributor 75 also engages its #9 contact, thereby connecting zero potential from the source 85 over the conductor 100, the wiper of said distributor and its #9 contact, conductor 108 to one midpoint of the bridge network of the tube 94, while the other midpoint of said network is connected to said potential over the conductor 100, the roll 73 and brush 74, and the conductors 105 and 109, thus raising the grid voltage of said tube to zero and causing the same to fire. The tube is maintained conductive from the intermediate terminal of source 85 through the winding of relay 110, tube 94 and its holding resistor, the common conductor 106, and the contact of cam c2 to the positive terminal of said source 85. Relay 110 is energized by the current flowing from the plate of said tube 94 and its energization is utilized in connection with the elimination of zeros to the left of a significant figure, as described in said co-pending application.

Upon completion of the sensing of the hole at the #9 index point position, the print cam c4 closes to establish circuits from the positive terminal of the source 85 for the energization of the twenty-four previously mentioned electromagnetic devices 38 whose associated printing elements are to be retracted while the remaining eleven printing elements whose devices 38 are not energized are maintained in their print positions to form the letter I. Said circuits for energizing the devices 38 extend from the positive terminal of source 85 over the conductor 97, the contact of cam c4, conductor 70 and bus 69, the windings of the twenty-four devices 38, the conductors 71 connected to said windings, the conductors 95, the contact I of the zoning relay 79, tube 94 and through the winding of relay 110 to the intermediate terminal of the source 85. All of said devices 38 are now energized to attract their armature latches 47 to thus remove the shoulders 49 thereof from the path of the collar 50 of their respective printing elements to thereby permit the springs 44 engaging said collars to expand and thus retract twenty-four printing elements to their non-print positions. The armature latches of the eleven devices 38 which form the letter I remain in their de-energized positions so as to prevent retraction of the associated printing elements and the foregoing operation takes place while the bail 53 is in its rearward or dwell position shown in Fig. 2. At the same instant that the above described circuits through the contact I, tube 94 and relay 110 are closed, a parallel circuit from said contact is closed over the common conductor 122 through winding of the print hammer magnet 66 and the conductor 123 to the intermediate terminal of the source 85. As previously described, energization of said magnet releases the associated print hammer so that it will be projected to print the letter I on the sheet 33, the slight interval of time consumed in this movement of the hammer being sufficient for the twenty-four printing elements to be retracted enough so that they will not interfere with the proper printing of the character by those elements which remain in print position. Upon restoration of the print hammer following its printing operation, the bail 53 then advances to restore the retracted printing elements to print position preparatory to another selection in the next operating cycle. It will be obvious that if no hole is sensed in a card column, the print hammer magnet will not be energized to release its hammer and therefore no printing will occur.

In the event that no one of the three zoning tubes 76 to 78 is fired due to the failure of the brush 74 to sense a hole in the three zoning points on a card, indicating that a numerical character is to be printed, it will be apparent from the foregoing that relay 83 connected to the cathode elements of said tubes will not be energized and therefore its back contact 84 will remain closed. Hence, as soon as the cams c1 and c3 close their contacts, an energizing circuit for the numerical zoning relay 82 will be established extending from the source 85 through the conductor 97, the contact of cam c1, conductor 98, winding of relay 82, back contact 84 of relay 83, the conductor 103, and the contact of cam c3 to the intermediate terminal of source 85. Upon energization of relay 82 in this circuit, its group of numerical contacts 1 to 9 are closed and await the sensing of the hole punched in one of the numerical index points in the card column. When this occurs, zero potential will be applied to the grid of one of the tubes 86 to 94, depending upon which hole is sensed, through the brush 74 and distributor 75 in a manner which will now be understood. Said tube will then fire and remain conductive through the contact of cam c2 and conductor 106, as previously described. Upon closure of the print cam c4 at the conclusion of the sensing of the last index point position of a card, energizing circuits will be established for the electromagnetic devices 38 which are to be retracted to non-print position so that those printing elements remaining in print position will form the desired numerical character. Said circuits extend, as previously described, through said cam c4, the windings of the devices 38 which are to be energized and over the conductors 71 connected to the numerical contact of relay 82 that extends to the plate elements of the fired tube, and from thence the circuit extends through the winding of relay 110 to the intermediate terminal of the source 85. As previously described, energization of the selected group of devices 38 permits retraction of their respective printing elements to non-print position, whereupon the print hammer is advanced to print the numeral formed by those printing elements which remain in print position.

With respect to the character 0, it has been previously mentioned that the same is formed by the energization of the same group of electromagnetic devices 38 whether said character is to indicate a letter or a zero, but that the selection of said group to print the letter is accomplished differently than when a zero is to be printed. This difference originates in the code punched in a card column and the consequent firing of different Thyratrons during the course of the analysis of said column. The letter is formed by punching the index points #11 and #6, while for a zero, only the zoning index point #0 is punched. From the foregoing description it will now be understood that the group of conductors connected to the contact 0 controlled by the zoning relay 80 and selected for the energization of the devices 38 which control the printing of the letter O, is accomplished by the firing of the zoning tube 77 and the numerical tube 91. When only the #0 index point position is punched in the card column, indicating that a zero is to be printed, only the zoning tube 78 is fired and, at the conclusion of the sensing of said column, the zero print cam c5 (Fig. 6) is closed. Firing of the tube 78 energizes the zoning relay 81 in series therewith, closing its contacts S to Z, but this will have no effect since none of the numerical tubes 86 to 94 is fired to extend the circuits for the devices 38 through any one of the latter tubes. However, the closure of the additional contact 111 (Fig. 6) of relay 81 will connect the conductor 112 leading from said contact to the conductor to which the 0 contact of said relay is joined, and this will extend the circuits for the energization of the devices 38, which are to be retracted to form the character 0, from the conductor 111 through the back contact 113 of relay 110 which is not energized at this time due to the non-conductive condition of all the tubes 86 to 94, and thence over the conductor 114, plug 115 in the full line position of Fig. 6, and the contact of the zero print cam c5 to the intermediate terminal of the source 85, whereupon the selected devices 38 to be withdrawn from print position will be energized. At the conclusion of any printing operation and when the bail 53 has been advanced to return the retracted printing elements to print position and immediately thereafter restored to its dwell position, all five of the control cams heretofore described open their contacts to de-energize all devices 38 and relays in the various circuits, and again render all Thyratrons non-conductive preparatory to the next card analysis.

What is claimed is:

1. In a printing machine, a plurality of printing elements having print and non-print positions, said elements being grouped to form different characters and selectively controlled in various combinations each capable of printing one of said characters, means to move said printing elements from print to non-print position, a latch device cooperating with each printing element to prevent movement thereof from print position, means to select a combination of said printing elements for movement to non-print position, means responsive to the last named means to render ineffective the latch devices associated with the printing elements of said combination to thereby transfer control of the latter elements to said moving means, and means thereafter operable to print a character represented by the printing elements which remain in print position.

2. In a printing machine, a plurality of printing elements having print and non-print positions, said elements being grouped to form different characters and selectively controlled in various combinations each capable of printing one of said characters, means to move said printing elements from print to non-print position, a latch device cooperating with each printing element to prevent movement thereof from print position, means to select a combination of said printing elements for movement to non-print position, means responsive to the last named means to render ineffective the latch devices associated with the printing elements of said combination to thereby transfer control of the latter elements to said moving means, and a print hammer cooperating with the printing elements remaining in print position to print a character subsequent to the movement of said selected combination of printing elements to non-print position.

3. In a printing machine, a plurality of printing elements having print and non-print positions, said elements being grouped to form different characters and selectively controlled in various combinations each capable of printing one of said characters, means to move said printing elements from print to non-print position, a latch device cooperating with each printing element to prevent movement thereof from print position, means to select a combination of said printing elements for movement to non-print position, means responsive to the last named means to render ineffective the latch devices associated with the printing elements of said combination to thereby transfer control of the latter elements to said moving means, a print hammer cooperating with the printing elements remaining in print position to print a character subsequent to the movement of said selected combination of printing elements to non-print position, and restoring means subsequently operated to return said selected combination of printing elements to their print position.

4. In a printing machine, a plurality of printing elements having a normal print position and a non-print position between which they are movable, said elements being grouped to form different characters and selectively controlled in various combinations each capable of printing one of said characters, record sensing means, an electromagnetic device for each printing element and having means cooperating with its element for releasably maintaining the same against movement from print to non-print position, a circuit energized in response to the sensing of data in a record to actuate certain of said magnetic devices so that said cooperating means will release their printing elements for movement to non-print position, means to move the last named elements to non-print position, and means cooperating with the printing elements remaining in print position to print a character identified by the latter elements.

5. In a printing machine, a print head including a plurality of printing elements having print and non-print positions between which they are movable, said elements being selectively operable in combination with others to form different groups of said elements each identifying one of a plurality of different characters by a movement of the selected elements from print to non-print position, means to releasably retain all said elements in print position before selection of a combination thereof, record sensing means, a switch for each group of printing elements so formed, a circuit for each of said switches energized in response to said sensing means for closing said switch to thereby select a group of said elements for movement to non-print position, means controlled by the closure of said switch to release the retaining means of the selected group of elements, means to then move said group from print to non-print position, and means cooperating with the remainder of said plurality of elements to print a character formed thereby.

6. In a printing machine, a print head including a plurality of printing elements having print and non-print positions between which they are movable, said elements being each selectively operable in combination with others to form different groups of said elements each identifying one of a plurality of different characters by a movement of the selected elements from print to non-print position, means to releasably retain all of said elements in print position before selection of a combination thereof, record sensing means, a switch for each group of printing elements so formed, a circuit for each of said switches energized in response to said sensing means for closing said switch to thereby select a group of said elements for movement to non-print position, means controlled by the closure of said switch to release the retaining means of the selected group of elements, means to move said group from print to non-print position, a print hammer cooperating with the remainder of said plurality of elements to print a character formed by the remaining elements, means to operate said hammer, and electromagnetic means in said circuit energized when said switch is closed to render effective the operating means for said print hammer.

7. In a printing machine, a print head including a plurality of printing devices having a normal print position and each selectively operable in combination with others in said head to form any one of a plurality of different characters, an electromagnetic device individual to and cooperating with each of said printing elements and having means to retain said printing element in its normal position, means to selectively energize a group of said devices to disable their retaining means, means thereupon operable to move the printing elements individual to the energized devices from their print position to a non-print position, and means cooperating with those printing elements remaining in print position to print a character formed thereby.

8. In a printing machine, a plurality of movable printing elements having a normal print position and each selectively operable in combination with others to form from the remainder thereof any one of a plurality of complete and different characters during a single movement of said selectively operable elements, means to simultaneously move said operable elements from their normal position to a non-print position, normally operative latching devices for said printing elements rendering said moving means ineffective, means to selectively actuate a group of said latching devices to release a corresponding group of printing elements for simultaneous movement to non-print position under control of said moving means, and means then operable to print the character identified by the printing elements whose latching devices remain in operative position.

References Cited in the file of this patent or the original patent

UNITED STATES PATENTS

| Number | Name | Date |
|---|---|---|
| 1,028,037 | Lilleberg | May 28, 1912 |
| 1,489,015 | Sherman | Apr. 1, 1924 |
| 1,853,443 | Maul | Apr. 12, 1932 |
| 2,129,065 | Loop | Sept. 6, 1938 |
| 2,248,522 | Conrad | July 8, 1941 |
| 2,334,534 | Ballweg | Nov. 16, 1943 |
| 2,353,083 | Roth | July 4, 1944 |
| 2,486,985 | Ruderfer | Nov. 1, 1949 |
| 2,524,127 | Johnson | Oct. 3, 1950 |

FOREIGN PATENTS

| Number | Country | Date |
|---|---|---|
| 523,698 | Germany | Aug. 21, 1933 |